United States Patent [19]

Beier et al.

[11] Patent Number: 5,630,858
[45] Date of Patent: May 20, 1997

[54] TEMPERATURE RESISTANT MATERIAL, PARTICULARLY AS SUBSTITUTE FOR ASBESTOS IN DEVICES FOR HANDLING OBJECTS OF HOT GLASS

[75] Inventors: Wolfram Beier, Essenheim; Jochen Heinz, Sprendlingen; Henning Franek, Braunfels; Dirk Bohr, Staudt, all of Germany

[73] Assignee: Westerwald Glasstein GmbH, Wirges, Germany

[21] Appl. No.: 297,888

[22] Filed: Aug. 30, 1994

[30] Foreign Application Priority Data

Nov. 10, 1993 [DE] Germany ............ 43 38 270.3

[51] Int. Cl.⁶ ............ C03B 21/00; C03B 29/00
[52] U.S. Cl. ............ 65/102; 65/24; 65/26; 65/357; 65/374.1; 65/374.11; 65/374.13; 65/374.15
[58] Field of Search ............ 65/374.1, 374.11, 65/374.13, 374.15, 102, 103, 107, 111, 24, 26, 169, 170, 182.5, 275, 288, 357

[56] References Cited

U.S. PATENT DOCUMENTS

| | | | |
|---|---|---|---|
| 2,560,599 | 7/1951 | Ryan | 49/67 |
| 3,681,187 | 8/1972 | Bowen et al. | 65/374.13 |
| 4,966,935 | 10/1990 | Takahashi | 524/412 |
| 5,125,949 | 6/1992 | Hirota et al. | 65/374.13 |

FOREIGN PATENT DOCUMENTS

| | | | |
|---|---|---|---|
| 0386944 | 9/1990 | European Pat. Off. | C03B 11/08 |
| 2135122 | 12/1972 | France . | |
| 3644063 | 6/1988 | Germany . | |
| 4024536 | 2/1992 | Germany | B32B 25/10 |

OTHER PUBLICATIONS

Tooley, Fay, V., Handbook of Glass Manufacturing, vol. 2, p. 189 1961.
Journal of Materials Science, Bd.24, Nr.12, Dec. 1989, London GB Seiten 4177–4208.
I.W. Donald 'methods for improving the mechanical properties of oxide glasses'—Seite 4196; Tabelle IX; Seite 4200; Tabelle X.

*Primary Examiner*—Donald E. Czaja
*Assistant Examiner*—Michael Philip Colaianni
*Attorney, Agent, or Firm*—Michael D. Bednarek; Kilpatrick & Cody, L.L.P.

[57] ABSTRACT

A temperature resistant material consisting of fiber-reinforced glass and fiber-reinforced ceramics, respectively, is described as asbestos substitute in devices for handling hot glass, glass ceramics and ceramics objects.

24 Claims, No Drawings

TEMPERATURE RESISTANT MATERIAL, PARTICULARLY AS SUBSTITUTE FOR ASBESTOS IN DEVICES FOR HANDLING OBJECTS OF HOT GLASS

BACKGROUND OF THE INVENTION

In the manufacture of glass objects, it is frequently necessary to handle or process hot products or hot semi-finished products with a temperature between 200° and 1000° C. The hot products or semi-finished products usually have a temperature above 200° C., commonly in the range of 300° to 700° C., depending on the processed glass type and the respective production step. The devices in or with which this handling is performed, are mostly transporting, handling and processing machines, which include extrusion, shaping, positioning, transfer and removal machines or components of such machines, which come into contact with the hot glass object, i.e. grippers, pushers, slides, turning devices, depositing plates, slide and starter rails, slide pieces, conveyor belt segments, deflection rollers, conveyor rollers, stripper plates, push rods, deflectors, gripper claws, inserts, cooling oven push rods, supports for conveyor devices, positioning gauges, moulds or mould parts, cutters, etc.

In many cases only the actual contacting areas of the components, where a combined thermo-tribo-mechanical stress occurs, are made of temperature resistant materials, whereas the components themselves are not.

Until now mainly asbestos or asbestos containing materials were used for such hot handling applications. Due to the health hazards involved with the use of asbestos, the use of asbestos is more and more reduced and substitutes are frequently already used.

All known asbestos substitutes, however, have one or more specific disadvantages.

Commonly used ceramics fiber materials are subject to high wear and tear, i.e. they only have a limited life, which results in high retrofitting costs. They release rubbed-off fibers, which results in the contamination of machines and workshops and the possible disruption of sensors, the rubbed-off fibers additionally also absorb lubricant oil fogs from the air which, due to their large surface, leads to an increased fire hazard.

Massive, monolithic ceramics tend to get brittle fractures, particularly in the case of impact or knock stress, but also in cases of a slowly applied tension, such as during the application of screw connections, and it only possesses a low thermo shock resistance and is difficult to join, for instance in screw-connections with machine parts of steel.

Graphite is subject to high wear and tear, which results in high retrofitting costs, also tends to get brittle fractures if subjected to impact or knock stress, is also difficult to join, possesses a high heat conductivity, which easily results in material cracks during hot glass handling and tends to oxidize in a hot oxidizing atmosphere. Graphite is frequently also too smooth in order to grip hot glass.

Metals and anodizations frequently possess a high specific weight, which results in an increased energy consumption, especially with high cycle frequencies (accelerations), they possess a high heat conductivity, which easily results in material cracks, and they can result in rubbed-off metal parts, which immediately results in waste during the production or indirectly results in waste since metal traces in hot glass induce cracks.

Plastics, e.g. those on a fluorocarbon resin or polyimide basis only possess an insufficient thermic stability, they deform uncontrollably if the thermic stress is too high, and can additionally release aggressive or health hazardous gases which contaminate the glass products. A possible result of the contamination is that the glass products cannot be imprinted any more.

Metals and ceramics furthermore possess very high coefficients of friction in contact with hot glass, so that it is frequently necessary to apply large quantities of lubricating oils or firm lubricants. These lubricants spread throughout the plant, through evaporation, for instance, and have to be regularly removed in a labor-intensive process, in order to minimize the danger of accidents through slipping on floor and stairs.

DESCRIPTION OF THE INVENTION

The object of the invention is therefore to find a material, particularly as a substitute for asbestos, for devices for handling hot glass objects, which is mechanically stable, can be joined easily and has a high thermo shock resistance, a high resistance against wear and tear and a long life, as well as a sufficiently low heat conductivity, does not leave traces on the glass object and requires little or no lubricant.

This task is solved with the material described in Patent claim 1, namely a temperature resistant material characterized in that it consists of fiber reinforced glass or fiber reinforced glass ceramics.

Surprisingly it was found that fiber-reinforced glass and fiber-reinforced glass ceramics, respectively, can replace asbestos in many applications in the area of hot handling of glass and even surpass asbestos in some characteristics.

During the hot handling of glass, the hot glass objects which come into contact with the fiber-reinforced glass and fiber-reinforced glass ceramics, respectively, have temperatures of 200° to 1000° C., generally, for example in the manufacture of utility glassware of soda-lime or crystal glass, in the range of 300° to 700° C. The temperature of the glass objects during the handling is the highest immediately after the moulding process, for example during removal from the moulding area, and generally decreases during the further course of the handling. It is self-understood that the fiber-reinforced glass material must not melt at the temperatures at which the hot glass objects are handled. In theory all glass can be reinforced with ceramic fibers. However, in order to reduce inner tensions as much as possible or avoid them altogether, it makes sense to work towards a certain adaptation of the thermic expansion coefficients. Since carbon and silicate carbide fibers possess small heat expansions, glasses with a heat expansion below 10 ppm/K are preferred as matrix.

Especially advantageous are glasses with heat expansions below 5 ppm/K. The $T_g$ value of the glass should also be at least roughly adapted to the desired application temperature of the composite, i.e. the selected glass should not have a glass transition temperature which is too low.

Surprisingly it was found, however, that fiber-reinforced glasses can also successfully be used at temperatures which are above the $T_g$ value of the glass matrix. One example for this are composites with a matrix from the borosilicate glass Duran ($T_g$: approx. 530° C.), which can be used with temperatures up to 700° C. under certain circumstances.

The maximum allowable temperature obviously depends on the contact time and the deformation which can be tolerated in the respective application. Possible deformations of the fiber-reinforced glasses, however, are always considerably below those of the un-reinforced glasses even at high temperatures, as was shown in corresponding creeping tests.

It is recommended, however, for reasons of rationalization, to select such glasses for the matrix which possess a high enough $T_g$ in order to meet virtually all requirements. Borosilicate glasses, the most well-known representatives of which are marketed under the names Duran® or Pyrex® have proven to be particularly suitable. These glasses have a composition (in weight %) of approx. 70–80 $SiO_2$, 7–13 $B_2O_3$, 4–8 alkali oxide and 2–7 $Al_2O_3$ and a $T_g$ of approximately 500°–600° C.

For even higher temperatures, high temperature resistant glasses are suitable as they are used in electronics, for instance or in lamp building, particularly the aluminosilicate glasses or aluminophospho-silicate glasses which are free of alkali of low in alkali, for instance a composition (in weight %), such as approx. 50–55 $SiO_2$, 20–25 $Al_2O_3$, 10–20 alkaline earth oxides, 5–10 $P_2O_5$, 0–5 $B_2O_3$, 0–0.5 alkali oxides or a composition such as 50–55 $SiO_2$, 20–25 $Al_2O_3$, 10–20 alkaline earth oxides, 5–10 $P_2O_5$, 0–5 $B_2O_3$, 0–0.5 alkali oxides or the composition 50–55 $SiO_2$, 8–12 $B_2O_3$, 10–20 alkaline earth oxides, 20–25 $Al_2O_3$. These glasses have a $T_g$ in the range of approx. 650–750.

Glass ceramics, which have been available on the market since approx. 1957, possess an even higher temperature resistance as matrix. Appropriate material systems are $Li_2O$—$Al_2O_3$—$SiO_2$, $MgO$—$Al_2O_3$—$SiO_2$, or $CaO$—$Al_2O_3$—$SiO_2$, for instance, which can be modified in various ways through additives. Glass ceramics and their manufacture through controlled crystallization have been known to the expert for decades and have been described in numerous publications, for example W. Vogel, Glaschemie ["Glass Chemistry"], [Publisher:] Springer Verlag, Berlin 1992, Pages 319–410.

Because of their good mechanical processability, glass ceramics which contain mica as the crystal phase (e.g. phlogopite-type) are also suitable.

Reinforcement fibers for glass and glass ceramics are well known to the expert and for the present purpose all inorganic reinforcement fibers are suitable. Fibers of carbon, SiC, $Si_3N_4$, $Al_2O_3$, $ZrO_2$ and/or mullite are mainly used as main components, with additives of Si, Ti, Zr, Al, O, C, N, for instance fibers of the sialon-type (Si, Al, O, N), if required. Carbon and silicate carbide fibers are particularly suitable.

The manufacture of fiber reinforced glass and fiber reinforced glass ceramics, respectively, is well known to the expert and has been described in numerous publications, of which only the U.S. Pat. Nos. 4,610,917, 4,626,515 and 5,079,196 are listed here as examples.

Composites can generally be tailored to the intended purpose through appropriate selection of matrix and fiber. Many physical characteristics, such as thermic expansion, heat conductivity, creep characteristics during thermic stress, tribological performance, etc. can be varied and adjusted within wide margins.

The fibers built into the composite can be varied in many ways, not only with regard to the chemical composition but also with regard to the microstructure, as well as the exterior geometry.

The microstructure of the fibers (with the same chemical composition) determines the physical characteristics. In the case of C-fibers, for instance, there are special high module and high-strength fibers, the different graphitization degree of which influences the tribological and thermical performance. Possibilities for variations therefore exist to a limited degree with the same reinforcement fibers, based on which the composite material can be optimized towards the desired characteristics.

The geometry (form and dimensions) of the reinforcement fibers and the arrangement of the fibers in the composite offers a particularly wide choice of variations.

The glasses and glass ceramics can be reinforced with whiskers, short fibers, long fibers or continuous fibers, for instance, and additional possibilities exist for the application of fiber mats, fiber fabrics, as well as for the application of fiber felt. Additionally, the course of the fibers in the material can be adjusted to the geometry of the component manufactured from the material through the creation of circular or other ring structures or ring-shaped components, for example through winding.

Whiskers and short fibers (up to approx. 5 mm fiber length) are usually distributed isotropically in the composite, which leads to isotrope characteristics, however, they can also be partially aligned, e.g. through extrusion at increased temperatures. A very high breakage resistance cannot be achieved with whiskers or short fibers. Long fibers and continuous fibers, however, are arranged parallel to each other, at least in larger portions of the composite, which results in a considerable improvement of the mechanical characteristics of the composite in this direction but hardly any improvement in the perpendicular direction. A large amount of isotroping, however, can also be achieved, at least regarding one level, if long fibers and continuous fiber are used through a laminate structure in which the fibers are arranged in angles to each other.

The composite production and moulding is generally more difficult with long fibers or continuous fibers than with whiskers and short fibers but it allows for the achievement of particularly good mechanical values in preferential directions. With the right selection of the fiber architecture, components can be developed which are adapted to the expected stress. The expert knows how to design the fiber architecture in fiber-reinforced components, e.g. from fiber-reinforced plastic components.

The use of fiber felt and fiber fabric results in composite materials which only possess mediocre qualities as compared to long fiber composite materials or continuous fiber composite materials, but which can be produced through more cost effective techniques. Fabric and felt can also be infiltrated with molten glass or sol-gel-solutions, for instance, which can be converted to glass or glass ceramics through a subsequent heat treatment.

The way in which the materials are manufactured for their specific purpose, i.e. whether they are manufactured with whiskers, continuous fibers, long fibers, short fibers, fabric, felt, etc. depends on the physical and technical requirements, i.e. for instance on whether certain characteristics are to be adjusted isotrope or anisotrope, and also on the costs involved in the production of the material, of course, which determine the price of the material and thus also its cost effectiveness.

The characteristics of the material are determined through the characteristics of its components. The right selection of matrix glass/matrix glass ceramics and fiber thus makes it possible to "tailor" the material to its respective application.

For applications on the air up to approx. 500° C. (temperature of the hot glass object) a carbon fiber reinforced material is suitable (dependent on the actual duration and frequency of the stress, as well as additional parameters, such as the requirement of low sliding friction in the dry run), applications at higher temperatures generally require oxidation resistant fibers, e.g. the more expensive SiC-fibers. Carbon fibers, on the other hand, are resistant to extremely high temperatures under inert or reduced conditions.

So-called hybrid composites can be manufactured if several different types of fibers are used, which are optimized for certain hot handling tasks. They can be optimized to a certain adhesion or friction performance for grippers, for instance, in order to ensure reliable gripping processes at high temperatures. Materials with a relatively high friction can be achieved through a high content of SiC fibers. However, it may also be desired to have as little friction as possible, e.g. in the case of pushers or slide pieces. In this case the composite is to contain fibers with a low friction coefficient, e.g. carbon fibers, particularly those with a higher graphitization coefficient.

Particularly advantageous are composites which contain both SiC fibers as well as C fibers. The former ensure a high basic stability and low wear and tear in their hot condition and the latter result in a certain self-lubrication. The fiber content in the composite material is approx. 10 to 70 vol. %. A higher fiber content can only be achieved with considerable costs; if the content of fibers in the composite drops below 20 vol-%, the attainable stability increase is drastically reduced and an even distribution of the fibers in the glass matrix/glass ceramics matrix becomes considerably more difficult. A fiber content of approx. 30 to 40 vol.-% is preferred for economical reasons. If different types of fibers are used, this is done in accordance with the desired characteristics of the composite. If a mixture of SiC and C-fibers is used, the vol.-ratio of the two types of fibers in the composite is between 1:20 and 1:0.05, depending on whether a high or low friction between composite and hot glass object are desired.

It is further possible to manufacture a porous glass material or glass ceramics material, either through incomplete compression or through release of gaseous components during the manufacture. The porosity changes the thermic conductivity, the elasticity module and the ability to absorb lubricants.

The fiber reinforced material can serve for the production of complete tool components, however, it is generally sufficient and more economical if the tool part itself is manufactured of metal and only the parts which come into contact with the hot glass parts are provided with a layer of the material. Due to the good mechanical processability of the material through sawing, drilling, milling and, in the case of mica-containing materials (phlogopite-type) also lathing of the same, it can be easily joined to steel parts, particularly through screw connections, e.g. as plates, rods, strips, also bent, angled, as round disc, etc.

The material according to the invention is suitable for all devices for the handling of hot glass objects as contact material for the parts which come into contact with the hot glass objects. For this purpose it is equal to or superior to the asbestos so far used for these purposes and by far surpasses the asbestos substitutes known until now.

It can also be used as material for moulding hot glass objects and molten glass, e.g. in order to form spouts on glass containers or coffee pots.

EXAMPLES

A strip of fiber-reinforced glass with the dimensions 45×25 mm and a thickness of 7 mm with a cut-out in the shape of a semi-circle was screwed onto a gripper clamp as contact piece (insert) for handling glass bricks. The fiber reinforced glass consisted of a borosilicate matrix (Duran®), which contained 30 vol.-% SiC continuous fiber. The fibers were arranged in 25 tapes, in which the fibers were arranged in an angle of 90 degrees to the previous layer. The glass bricks to be handled had a temperature of approx. 550° C. The resulting life for the contact piece was three times higher than that of the asbestos originally used in this process and 30 times higher than that of the asbestos substitute (aluminosilicate fiber material) used at the time.

Furthermore, 10×10×8 mm large (length×width× thickness) contact pieces of the same material were used as supporting pieces for approx. 550° C. hot glass bricks. The resulting life was three times higher than that of asbestos.

A positioning and handling device for glass bricks in which the glass brick is held and positioned with 4 strips (pallet) was provided with 130×25×8 mm large contact strips of the above composition which were screwed together. The life of these pallet strips corresponded approximately to that of asbestos strips. A slightly improved life was achieved through the use of carbon fibers instead of the SiC fibers for the pallet strips. The reason why the performance of the material according to the invention is so remarkable, is that no really suitable asbestos substitute had so far been found for supporting pieces and pallet strips.

The materials suggested as substitutes, such as carbon strips or graphite strips or fiber reinforced concretes are subject to such high wear and tear for various reasons (brittleness, difficult to join, lacking resistance to abrasion), that the use of asbestos for certain parts was still essential for heavy production conditions. The material according to the invention presents a substitute material which is at least equal to the asbestos and can be used virtually everywhere; it is therefore also not necessary any more to keep a great number of asbestos substitutes on stock for the different application purposes.

The abrasion of the material according to the invention is low and does not have the disadvantages of the fiber materials so far used as asbestos substitutes.

What is claimed is:

1. A method for handling hot glass, hot glass ceramics or hot ceramics objects comprising contacting said hot glass, hot glass ceramics or hot ceramics object with a temperature resistant material consisting of fiber-reinforced glass or fiber-reinforced glass ceramics, acting upon the hot glass, hot glass ceramics or hot ceramics object, and removing said temperature resistant material from the hot glass, hot glass ceramics or hot ceramics object.

2. A method for reshaping objects of hot glass or molten glass comprising contacting said hot glass or molten glass with a temperature resistant material consisting of fiber-reinforced glass or fiber-reinforced glass ceramics, reshaping the hot glass or molten glass, and removing said temperature resistant material from the hot glass or molten glass.

3. The method according to claim 1, wherein the contacting step comprises contacting the object with a fiber-reinforced material comprising a glass matrix selected from the group consisting of borosilicate glass, aluminosilicate glass, and glass with a high $SiO_2$ content.

4. The method according to claim 1, wherein the contacting step comprises contacting the object with a fiber-reinforced material comprising a glass matrix selected from the group consisting of $Li_2O$—$Al_2O_3$—$SiO_2$, $MgO$—$Al_2O_3$—$SiO_2$ and $CaO$—$Al_2O_3$—$SiO_2$.

5. The method according to claim 1, wherein the contacting step comprises contacting the object with a fiber-reinforced material comprising a glass ceramics of the phlogopite type with mica as the crystal phase.

6. The method according to claim 1, wherein the contacting step comprises contacting said object with a temperature resistant material having reinforcement fibers comprising main components selected from the group consisting of carbon, silicon carbide, $Si_3N_4$, $Al_2O_3$, $ZrO_2$ and mullite.

7. The method according to claim 6, wherein the reinforcement fibers used in the temperature resistant material of said contacting step further comprise at least one additive selected from the group consisting of Si, Ti, Zr, and Al.

8. The method according to claim 6, wherein the reinforcement fibers used in the temperature resistant material of said contacting step comprise at least one main component selected from the group consisting of carbon and SiC.

9. The method according to claim 1, wherein the contacting step comprises contacting said object with a temperature resistant material having a fiber content of 10 to 70% by volume.

10. The method according to claim 2, wherein the contacting step comprises contacting the object with a fiber-reinforced material comprising a glass matrix selected from the group consisting of borosilicate glass, aluminosilicate glass, and glass with a high $SiO_2$ content.

11. The method according to claim 2, wherein the contacting step comprises contacting the object with a fiber-reinforced material comprising a glass matrix selected from the group consisting of $Li_2O$—$Al_2O_3$—$SiO_2$, MgO—$Al_2O_3$—$SiO_2$ and CaO—$Al_2O_3$—$SiO_2$.

12. The method according to claim 2, wherein the contacting step comprises contacting the object with a fiber-reinforced material comprising a glass ceramics of the phlogopite-type with mica as the crystal phase.

13. The method according to claim 2, wherein the contacting step comprises contacting said object with a temperature resistant material having reinforcement fibers comprising main components selected from the group consisting of carbon, silicon carbide, $Si_3N_4$, $Al_2O_3$, $ZrO_2$ and mullite.

14. The method according to claim 13, wherein the reinforcement fibers used in the temperature resistant material of said contacting step further comprise at least one additive selected from the group consisting of Si, Ti, Zr, and Al.

15. The method according to claim 13, wherein the reinforcement fibers used in the temperature resistant material of said contacting step comprise at least one main component selected from the group consisting of carbon and SiC.

16. The method according to claim 2, wherein the contacting step comprises contacting said object with a temperature resistant material having a fiber content of 10 to 70% by volume.

17. The method according to claim 1, wherein the contacting step comprises contacting said object with a temperature resistant material comprising a glass matrix having a composition in weight % of approximately 70–80 $SiO_2$, 7–13 $B_2O_3$, 4–8 alkali oxide and 2–7 $Al_2O_3$, and a glass transition temperature, $T_g$, of approximately 500°–600° C.

18. The method according to claim 1, wherein the contacting step comprises contacting said object with a temperature resistant material comprising a glass matrix selected from the group consisting of alumino-silicate glasses and aluminophospho-silicate glasses.

19. The method according to claim 1, wherein the contacting step comprises contacting said object with a temperature resistant material comprising a glass matrix having a composition in weight % of approximately 50–55 $SiO_2$, 20–25 $Al_2O_3$, 10–20 alkaline earth oxides, 5–10 $P_2O_5$, 0–5 $B_2O_3$, 0–0.5 alkali oxides, and a glass transition temperature, $T_g$, of approximately 650°–750° C.

20. The method according to claim 1, wherein the contacting step comprises contacting said object with a temperature resistant material comprising a glass matrix having a composition in weight % of approximately 50–55 $SiO_2$, 8–12 $B_2O_3$, 10–20 alkaline earth oxides, 20–25 $Al_2O_3$, and a glass transition temperature, $T_g$, of approximately 650°–750° C.

21. The method according to claim 2, wherein the contacting step comprises contacting said object with a temperature resistant material comprising a glass matrix having a composition in weight % of approximately 70–80 $SiO_2$, 7–13 $B_2O_3$, 4–8 alkali oxide and 2–7 $Al_2O_3$, and a glass transition temperature, $T_g$, of approximately 500°–600° C.

22. The method according to claim 2, wherein the contacting step comprises contacting said object with a temperature resistant material comprising a glass matrix selected from the group consisting of alumino-silicate glasses and aluminophospho-silicate glasses.

23. The method according to claim 2, wherein the contacting step comprises contacting said object with a temperature resistant material comprising a glass matrix having a composition in weight % of approximately 50–55 $SiO_2$, 20–25 $Al_2O_3$, 10–20 alkaline earth oxides, 5–10 $P_2O_5$, 0–5 $B_2O_3$, 0–0.5 alkali oxides, and a glass transition temperature, $T_g$, of approximately 650°–750° C.

24. The method according to claim 2, wherein the contacting step comprises contacting said object with a temperature resistant material comprising a glass matrix having a composition in weight % of approximately 50–55 $SiO_2$, 8–12 $B_2O_3$, 10–20 alkaline earth oxides, 20–25 $Al_2O_3$, and a glass transition temperature, $T_g$, of approximately 650°–750° C.

* * * * *

UNITED STATES PATENT AND TRADEMARK OFFICE
CERTIFICATE OF CORRECTION

PATENT NO.    : 5,630,858
DATED         : May 20, 1997
INVENTOR(S)   : Wolfram Beier, et al.

It is certified that an error appears in the above-identified patent and that said Letters Patent is hereby corrected as shown below:

On the cover page, Item [73], under Assignee, additional assignee should be included, as follows: -- Schott Glaswerke, Mainz, Germany--.

Signed and Sealed this

Fourth Day of January, 2000

Attest:

Attesting Officer

*Acting Commissioner of Patents and Trademarks*